United States Patent [19]
Grant et al.

[11] Patent Number: 5,077,342
[45] Date of Patent: Dec. 31, 1991

[54] METHOD FOR PREPARING CARBOXYLATED STYRENIC RESINS

[75] Inventors: Thomas S. Grant, Vienna; David V. Howe, Parkersbrug, both of W. Va.

[73] Assignee: Borg-Warner Chemicals, Inc., Parkersburg, W. Va.

[21] Appl. No.: 58,012

[22] Filed: Jun. 4, 1987

Related U.S. Application Data

[63] Continuation of Ser. No. 829,577, Feb. 14, 1986, abandoned.

[51] Int. Cl.$^5$ ........................ C08F 22/06; C08F 51/04
[52] U.S. Cl. .................................... 525/285; 525/263; 525/289; 525/310; 525/315; 525/319; 525/324
[58] Field of Search ........................................ 525/285

[56] References Cited

U.S. PATENT DOCUMENTS 3,966,842 6/1976 Ludwig et al. ...................... 525/285
4,292,414 9/1981 Saito et al. ........................... 525/285

Primary Examiner—Jacob Ziegler
Attorney, Agent, or Firm—Lowe, Price, LeBlanc & Becker

[57] ABSTRACT

An improved method for carboxylating styrenic resins and particularly impact-modified styrenic resins such as ABS resins, by melt-processing a mixture comprising the styrenic resin, an ethylenically-unsaturated carboxylic compound, and, optionally, a free-radical generator.

4 Claims, No Drawings

METHOD FOR PREPARING CARBOXYLATED STYRENIC RESINS

This is a continuation of application Ser. No. 829,577 filed Feb. 14, 1986, now abandoned.

BACKGROUND OF THE INVENTION

The present invention relates to carboxylated styrenic resins and more particularly to an improved method for incorporating carboxyl functionality into preformed styrenic resins.

Hydrocarbon polymers such as polystyrene and the copolymers and graft polymers of styrene with acrylic esters, acrylonitriles and the like are generally incompatible or at best are only poorly compatible with dissimilar materials such as aliphatic and aromatic polyamides, widely termed nylon resins. Blends of certain nylon resins with some styrenic resins are known in the art, such as the blends of epsilon caprolactam polymers with acrylonitrile-styrene-butadiene (ABS) graft polymers exemplified in U.S. Pat. No. 3,134,746. Even though these known prior art blends exhibit many useful properties, lack of good compatibility between the polyamide and ABS often results in multi-phase or layered structures that exhibit poor interphase adhesion, with a concomitant tendency toward brittleness and delamination.

U.S. Pat. No. 3,668,274 discloses a method for preparing alloys of nylon resins and a multistage modifier resin consisting of a graft copolymer having an amine-reactive moiety copolymerized in the graft phase. The amine-reactive moiety, such as a copolymerizable carboxylic acid, is said to react with the amine end-groups of the nylon component to form covalent bonds between the nylon and graft copolymer components. These alloys are said not to exhibit phase separation during processing. More recently, in U.S. Pat. No. 4,496,690, the modification of styrenic resins to include an ethylenically-unsaturated carbonamide co-monomer is disclosed as reducing the tendency toward delamination in blends with nylons.

The presently available methods for combining styrenic resins and polyamides into alloys thus appear to be limited to use with specific styrenic copolymer resins or analogously modified polyamide resins. Preparing these specialty resins generally requires additional process steps, incurring increased costs and adding complexity to the manufacturing process. A method for the direct preparation of such alloys from commercially available, conventional styrenic resins and polyamides would greatly increase the number of resins that could be used in preparing such blends and lead to a wider variety of useful alloys. Such a process could be practiced either by the resin producer or by the resin compounder, and thus find wide application. Additionally, the over-all costs of producing such alloys could be reduced by eliminating the need for specialty styrenic resins, thereby benefiting the resin producer and the resin consumer.

Functional monomers have also been included in the preparation of styrenic resins where improved adhesion to mineral fillers is sought. Such added functionality may be useful to overcome the otherwise poor affinity of hydrocarbon resins for polar fillers such as glass fibers, clay fibers and the like. Without such modification, either by the surface treatment of the filler or by modification of the matrix resin, the resulting filled materials often exhibit reduced ductility and poor flexural strength.

A method for the direct incorporation of carboxylic functionality into commercially available, conventional preformed styrenic resins would be of substantial practical benefit to the resin industry. Such a process would greatly increase the variety of carboxylated styrenic resins available to the resin compounder for such applications as in preparing alloys of styrenic resins with polyamides, and for use in filled materials where such modification is needed to improve adhesion between the resin and the fillers.

SUMMARY OF THE INVENTION

This invention relates to carboxylated styrenic polymers. More particularly, the invention relates an improved method for for incorporating carboxyl functionality into styrenic resins, the improvement being the direct modification of a conventional styrenic resin by melt-blending a pre-formed styrenic resin with a minor amount of a copolymerizable, ethylenically-unsaturated carboxylic compound. The improved method of this invention provides carboxylated styrenic resins that are useful in preparing filled compositions and in producing alloys with polyamides that exhibit a reduced tendency to delaminate upon melt processing. The alloys have surprisingly high impact properties as well as tensile strength and high load heat distortion properties better than those of mere blends of nylon with conventional styrenic resins.

DETAILED DESCRIPTION

The styrenic polymers which may be usefully carboxylated for the purposes of this invention are polymers and copolymers of styrene. The preferred resins are those commonly designated as impact-modified styrenic resins. Impact modified styrenic resins are generally prepared by the graft polymerization of mixtures of styrene and optionally one or more additional copolymerizable vinyl monomers in the presence of a rubbery polymeric substrate. Analogous resins may also be produced by blending a rigid styrenic polymer matrix with a rubbery graft copolymer substrate. Comonomers which may be employed in mixtures with styrene for the preparation of rigid copolymers as well as for use as grafting monomers include the substituted styrenes such as alpha methylstyrene, halostyrenes, and alkyl styrenes or vinyl alkylbenzenes like vinyl toluene, vinylxylene, butylstyrene and the like, nitrile monomers such as acrylonitrile and methacrylonitrile, and acrylate monomers such as the lower alkyl esters of methacrylic acid and mixtures thereof. The rubbery polymeric substrate portion will comprise from 5 to 80%, preferably from 5 to 50% of the total weight of the graft polymer and will include rubbery polymers selected from the group consisting of polybutadiene, polyisoprene, rubbery styrene-diene copolymers containing up to 50 wt % styrene, acrylic rubber, nitrile rubber and olefin rubbers such as EPDM and EPR. Specific examples of graft polymers which may be usefully carboxylated for the purpose of this invention are the acrylonitrile-butadiene-styrene graft polymer resins (ABS), methylmethacrylate-butadiene-acrylonitrile-styrene (MABS) resins and the like.

In the practice of this invention, the styrenic resin is compounded with an ethylenically-unsaturated compound containing a carboxylic group, e.g., a carboxylic acid, anhydride or amide group, in a melt-blending process. Representative of such unsaturated carboxylic compounds are maleic anhydride, glutonic anhydride, itaconic anhydride, citraconic anhydride, tetrahydrophthalic anhydride and the like, as well as the carboxylic acid, amide and imide analogs thereof, i.e. maleic acid, fumaric acid, maleimide, itaconic acid and the like. The most effective unsaturated carboxylic compounds are those wherein the ethylenic unsaturation is conjugated with a carboxyl group e.g., the α,β-unsaturated carboxylic anhydrides. Nonconjugated unsaturated anhydrides such as Δ-4 tetrahydrophthalic anhydride may also be employed, however these are not preferred. The compounds useful for the purposes of this invention may be more broadly characterized as having both a reactive carboncarbon ethylenic double bond and a reactive carboxylic functional group.

The carboxylic compound will be employed at very low levels, and normally will comprise from 0.05 to 15 parts by weight (pbw) and more preferably from 0.1 to about 10 pbw per hundred parts by weight of styrenic resin. The level employed will depend in part upon the particular unsaturated carboxylic compound employed, and the optimum level for most purposes will lie in the range from about 0.1 to about 5 pbw for most applications. At levels below about 0.05 pbw, little or no improvement will be observed, while at levels much above about 10 pbw for most of the unsaturated carboxylic compounds the overall properties of the styrenic resin component begin to be affected detrimentally.

The styrenic resin is carboxylated in a melt-blending step, wherein the styrenic resin and the carboxylic compound are melt-processed using any of the conventional melt processing techniques such as, for example, Banbury mixing, milling and extrusion. Most conveniently, the mixture of the styrenic resin and the carboxylic compound are meltmixed at a temperature in the range of from 450°-650° F., using a compounding extruder. Optionally, from about 0.01 to about 2.0 pbw of a free-radical generator such as a peroxide or perazo compound may also be included. Representative of suitable free-radical generators are dicumyl peroxide, benzoyl peroxide, cumene hydroperoxide, azobisisobutyronitrile and the like.

The carboxylated styrenic polymers, when melt-mixed with nylons, form alloys rather than simple polymer mixtures or blends. These alloys exhibit unexpectedly great improvement in impact properties as compared with equivalent blends of unmodified styrenic polymers with nylons. These alloys, which may comprise from 5 to 95 wt % carboxylated styrenic polymer and correspondingly from 95 to 5 wt % polyamide, are readily processable thermoplastic compositions which exhibit no significant delamination upon extrusion or molding. These characteristics demonstrate that the compositions of this invention are not highly cross-linked, and yet exhibit processing characteristics of compatible mixtures.

The carboxylated styrenic resins of this invention are useful thermoplastics, and may be further compounded with such additives as thermal, oxidation and light stabilizers, lubricants, pigments dyes, fillers, flame retardants, glass and mineral fibers, reinforcing agents plasticizers and the like. Such additives are added in accord with techniques well known in the art in proportions which are commonly employed. The carboxylated styrenic resins of this invention may also be in blends with other resins such as polyesters, polycarbonates, and the like, and as modifiers in the preparation of glass-filled or mineral filled compositions.

The practice of this invention will be made more readily apparent by consideration of the following examples, which are provided by way of illustration and not limitation.

EXAMPLE 1–6—PREPARATION OF CARBOXYLATED STYRENIC RESINS

The carboxylated ABS resins summarized in Table I were prepared by dry blending the indicated amounts of the ABS and maleic anhydride, and the peroxide where employed, then feeding the dry blend to a Werner & Pfleiderer ZDS-K 28 mm co-rotating twin-screw extruder. The material was masticated at a barrel temperature in the range 450°-550° F. and extruded. The extrudate was chopped to form pellets of the resulting carboxylated ABS resin.

The level of carboxylic anhydride bound to the carboxylated ABS resin was determined by first dissolving or suspending the carboxylated ABS resin in methyl ethyl ketone (10 g/50 ml), then re-precipitating the resin with isopropanol. The level of carboxylic compound remaining in the reprecipitated and dried resin was determined by I.R. analysis, reported as % incorporation based on the amount of carboxylic compound originally charged. The carboxylated resins and the levels of carboxylation are summarized in Table I.

To further demonstrate the carboxylation of the ABS resin, the carboxylated ABS prepared in the above step was blended with Nylon 6 (poly-e-caprolactam) by feeding equal parts of the modified ABS and Nylon 6 to Werner and Pfleiderer ZDS-K 28 MM co-rotating twin screw extruders using a melt-temperature of approximately 500° F. The melt-mixed blend was extruded, and the cooled extrudate chopped, then injectionmolded to provide test specimens. The blends and the results of impact testing are summerized in Table I.

Control Examples A–C are blends of Nylon 6 with unmodified ABS, prepared in substantially the same manner.

TABLE I

| EX. NO. | 1 | 2 | 3 | 4 | 5 | 6 | A | B | C |
|---|---|---|---|---|---|---|---|---|---|
| Maleation Step: | | | | | | | | | |
| ABS I pbw | 100 | 100 | 100 | 100 | — | — | 100 | — | — |
| ABS II pbw | — | — | — | — | 100 | — | — | 100 | — |
| ABS III pbw | — | — | — | — | — | 100 | — | — | 100 |
| Maleic Anh pbw | 0.5 | 1.5 | 1.5 | 2.0 | 1.5 | 1.25 | — | — | — |
| Di Cup pbw | 0.5 | 0 | 0.75 | 0.5 | 0.5 | 0.1 | — | — | — |
| Lubricant pbw | — | — | — | — | — | 0.25 | — | — | — |
| % Incorp. pbw | 50 | 48 | 61 | 75 | 65 | N.D. | — | — | — |
| Blend With: | | | | | | | | | |
| Nylon 6 | 100 | 100 | 100 | 100 | 100 | 100 | 100 | 100 | 100 |
| Izod Impact | 2.6 | 6.6 | 4.4 | 4.2 | 15.5 | 5.4 | 1.3 | 2.3 | — |

TABLE I-continued

| EX. NO. | 1 | 2 | 3 | 4 | 5 | 6 | A | B | C |
|---|---|---|---|---|---|---|---|---|---|
| Delamination | none | none | none | none | none | none | severe | severe | severe |

Notes:
ABS I = Blendex 101 ABS resin;
ABS II = Blendex 131 ABS resin;
ABS III = Blendex 133 resin, all from Borg-Warner Chemicals, Inc.
Nylon 6 Capron 8209F from Allied Chemical Corp.
Lubricant = F88 ethylene oxide - propylene oxide copolymer from BASF Wyandotte
Izod Impact = Ft lbs/in notch, at R.T., ½" × ⅛" bars, injection molded
Di Cup = Dicumyl peroxide
% Incorp. % of maleic anhydride attached to ABS; by extraction The interaction of the ethylenically unsaturated carboxylic compound and the styrenic resin, appears to result in carboxylation of the styrenic resin, as is demonstrated by the level of maleic anhydride incorporation for Examples 1–5. The level of incorporation appears to be somewhat unpredictable, varying with the levels of carboxylic compound and free radical generator employed as well as with the processing conditions. However, as shown by the delamination characteristics and impact properties of the blends of the modified ABS resins of with Nylon 6, Examples 1–6, the levels of incorporation that result in the process of this invention significantly improve these blends as compared with the blends of unmodified ABS and Nylon 6 shown as Control Examples A–C.

CONTROL EXAMPLE D. A DIRECT BLEND OF POLYAMIDE, STYRENIC RESIN AND ANHYDRIDE

A mixture of 50 pbw ABS I, 49 pbw Nylon 6, 1.0 pbw maleic anhydride and 0.25 pbw dicumyl peroxide was prepared by dry blending the components. The mixture was then fed to the compounding extruder used in Examples 1–6, meltmixed at a barrel temperature of approximately 500° F., and extruded. The chopped pellets of cooled extrudate were injection molded to form test specimens. This direct-blend product had an izod impact of 1.2 ft lbs/in notch, demonstrating that process of this invention, wherein the styrenic resin is first carboxylated by melt-mixing with the ethylenically unsaturated carboxylic anhydride then blended with the polyamide component, is more effective than a direct processing of all components in a single step.

In the practice of the process of this invention, it may be desirable for some applications to remove the portion of the carboxylic compound that remains unattached to the styrenic resin. The presence of low molecular weight carboxylic compounds in such resins may contribute to cross-linking or otherwise deleterious interactions in blends with polyamides and the like, and may undergo undesirable side reactions with further additives such as stabilizers, antioxidants, flame retardants and the like. Removal of these low molecular weigth carboxylic compounds may be conveniently accomplished by devolatizing the resin in the melt-blend step by using a vented extruder, or preferably a vacuum-vented extracted, to accomplish the compounding. Alternatively, and less preferred, the resin may be solvent-extracted, or dissolved in an appropriate solvent and reprecipitated, to remove the low molecular weight carboxylic compounds.

EXAMPLE 7

A sample of ABS II was carboxylated by melt-mixing 100 pbw of the resin with 2.0 pbw maleimide and 0.1 pbw dicumyl peroxide. The extrudate resin, which showed carboxyl incorporation by I.R., was then melt-mixed with an equal weight of Nylon 6. The alloy extrudate appeared smooth. A similar alloy, prepared by first melt-mixing 100 pbw ABS II with 2.5 pbw N-phenyl maleimide to provide a product which similarly showed carboxyl incorporation by I.R., then combining the product with an equal weight of Nylon 6, also gave a smooth extrudate.

The process of this invention may thus be extended to the carboxylation of styrenic resins with a variety of ethylenically-unsaturated amide compounds.

The invention will thus be understood to be an improved process for the carboxylation of styrenic resins wherein a conventional, preformed styrenic resin is melt-mixed with from 0.05 to 10 pbw of an ethylenically-unsaturated carboxylic anhydride, per hundred parts by weight of styrenic resin, optionally in the presence of a free radical generator. Further improvements and modifications of the process of this invention will be readily apparent to those skilled in the art, and such modifications may be made with out departing from the spirit and scope of the invention as defined by the following claims.

We claim:

1. A composition prepared by melt-mixing at a temperature in the range of 450°–650° F., a mixture consisting essentially of 100 parts by weight of a pre-formed graft polymer comprising styrene, acrylonitrile and butadiene and from 0.05 to 10 parts by weight of maleic anhydride.

2. The composition of claim 1 wherein said mixture further comprises a free-radical generator.

3. A method for carboxylating a styrenic resin comprising providing a mixture consisting essentially of 100 pbw of a pre-formed graft polymer comprising styrene, acrylonitrile and butadiene, and from 0.05 to 10 pbw of maleic anhydride; and melt-mixing said mixture at a temperature in the range of 450°–650° F.

4. The method of claim 3 wherein said mixture further comprises from 0.01 to 2.0 pbw of a free-radical generator.

* * * * *